United States Patent [19]

Toyomura

[11] 4,343,968
[45] Aug. 10, 1982

[54] ELECTRONIC DEVICE HAVING UNITARY DISPLAY AND PRINTING SECTIONS

[75] Inventor: Shigeru Toyomura, Kawasaki, Japan

[73] Assignee: Canon Kabushiki Kaisha, Tokyo, Japan

[21] Appl. No.: 131,489

[22] Filed: Mar. 18, 1980

[30] Foreign Application Priority Data

Mar. 27, 1979 [JP] Japan .................................. 54-36039

[51] Int. Cl.³ .......................... H05B 1/00; G06F 3/12
[52] U.S. Cl. .............................. 178/23 R; 346/76 PH; 364/710
[58] Field of Search ............. 178/23 R; 364/518, 519, 364/520, 523, 710; 340/716; 346/76 PH, 140 R, 140 PD, 17; 400/120; 219/216

[56] References Cited

U.S. PATENT DOCUMENTS

| 3,626,830 | 12/1971 | Sobottka et al. | 340/716 |
| 3,965,476 | 6/1976 | Wenander et al. | 346/17 |
| 3,973,111 | 8/1976 | Washizuka et al. | 364/710 |
| 4,044,228 | 8/1977 | Kishimoto et al. | 346/76 PH |

Primary Examiner—Thomas A. Robinson
Attorney, Agent, or Firm—Fitzpatrick, Cella, Harper & Scinto

[57] ABSTRACT

To miniaturize an electronic device such as an electronic table computer provided with a printer, the display part and printing part of the device are united together to form a unitary component. Wiring of signal lead line for driving the display and printing part is disposed on a base board. Furthermore, heat generated from the printing part is used to record on the heat sensitive recording paper.

4 Claims, 6 Drawing Figures

ELECTRONIC DEVICE HAVING UNITARY DISPLAY AND PRINTING SECTIONS

BACKGROUND OF THE INVENTION

1. Field of the Invention

The present invention relates to an electronic device such as an electronic desk-top calculator provided with a printer. More particularly, the present invention is directed to improvements in such electronic device in order to further reduce the size and manufacturing cost thereof by using a novel unitary arrangement of the display part and printing part.

2. Description of the Prior Art

A conventional electronic desk-top calculator comprises a keyboard part for data input, an operation part for operation processing the input data, a display part for displaying the result of the operation processing and a printing part for printing the result on a recording paper to produce an output of the result. As will be readily understood, in this conventional arrangement, the display part and the printing part, both of which serve as an output part for putting out the result of operation, are formed as two separate structural parts. Therefore, in designing the electronic table computer, it is required to keep a space for receiving the display part and also another space for receiving the printing part. Moreover, it is required at the same time to connect the operation part and the display part and also the operation part and the printing part using connector wiring.

Since the separate spaces and connector wirings are necessary for both of the display part and printing part which are independent of each other in this manner, this conventional arrangement constitutes an obstacle to miniaturization and cost reduction of the electronic table computer.

SUMMARY OF THE INVENTION

Accordingly, it is a general object of the invention to eliminate the disadvantages involved in conventional electronic devices as mentioned above by employing a novel arrangement of display and printing parts united together.

It is a more specific object of the invention to provide an electronic device which is small in size and low in manufacturing cost.

Other and further objects, features and advantages of the invention will appear more fully from the following description taken in connection with the accompanying drawings.

DESCRIPTION OF THE PREFERRED EMBODIMENTS

Figure 1:
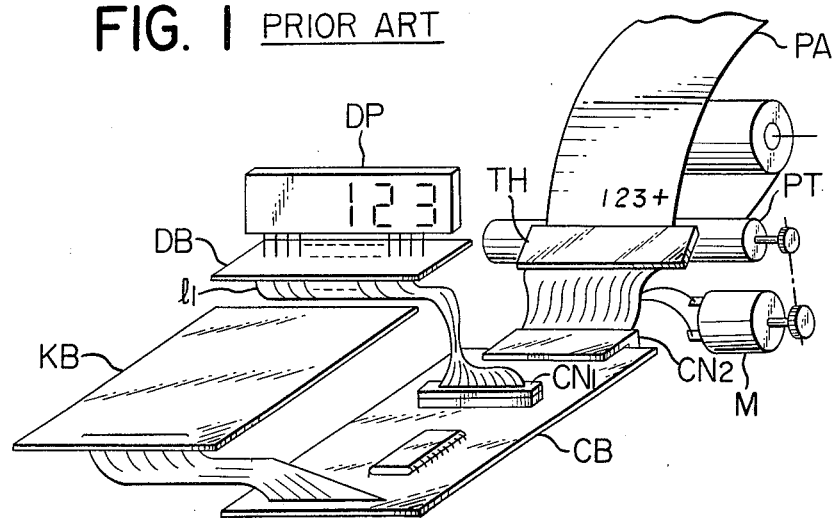
FIG. 1 is a perspective view of an exemplary electronic desk-top calculator with a printer according to the prior art.

In FIG. 1 showing an exemplary electronic desk-top calculator with a printer according to the prior art, KB designates a keyboard part on which numeral keys and function keys are mounted. CB is an operation part, that is, computing element for carrying out various calculator processings using signals coming from the keyboard part KB. This calculating element is composed of LSI, IC transistors, resistors, capacitors etc. in a manner known per se.

DP is a display part for outputting and displaying the result of operation or other display content by means of signals coming from the operation part CB. In the drawing, the display part DP is shown to be a fluorescent display tube by way of example.

DB is a display print board for mounting the display part, for example, a display panel DP. The display print board DB is electrically connected with the operation part through lead wiring $l_1$ and connector $CN_1$.

TH is a thermal head comprising a number of thermal elements for heating the surface of heat sensitive paper. The number of the thermal elements is equal to $5 \times$ the number of figures. These thermal elements are arrayed in a row. PA is a heat sensitive paper containing color coupler and color element. When the surface of the heat sensitive paper is heated by the thermal elements, the color coupler and color element are melted and a chemical reaction takes place to develop color.

Designated by PT is a platen for feeding the heat sensitive paper. The platen is driven by a stepping motor M. The printing part is connected with the operation part through lead wiring $l_1$ and connector $CN_2$ so that a result of operation as then wished may be printed on the heat sensitive paper under the control of the operation part.

According to the invention, the display panel DP and the thermal heat TH in the above conventional arrangement are united together to form a unitary component so that display print board DB, lead wiring $l_1$ and connector $CN_1$, and space for receiving the display part can be omitted.

Figure 2A:
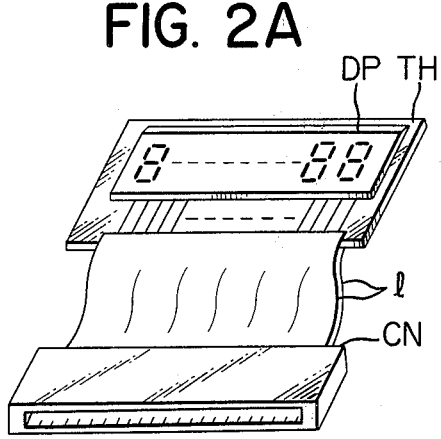
FIGS. 2A and 2B show an embodiment of the present invention.
Figure 2B:
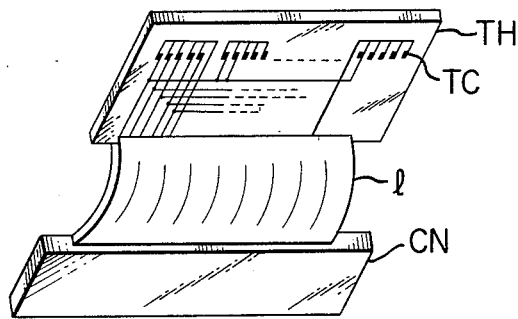

FIGS. 2A and 2B show an embodiment of the invention of which FIG. 2A is a perspective view thereof from the top side and FIG. 2B is that from the bottom side.

The printer head with display according to the invention is connected with the operation part through lead wiring 1 and connector CN. As seen from FIG. 2A, the display panel DP is formed on the surface of the thermal head TH. To make a display, there may be used fluorescent tubes commonly employed for this purpose, ⼞ segment display employing semiconductor light emitting diodes (LED) or liquid crystal indicators. On the backside surface of the thermal head there are disposed the above mentioned number of thermal elements TC as shown in FIG. 2B. As thermal element TC there may be various elements such as thin-film resistor, thick-film resistor, semiconductor diffusion type resistor or semiconductor barrier type resistor. Also, as shown in FIGS. 2A and 2B, signal line for display and signal line for printing are disposed on both the top side and backside surfaces of the base board of the thermal head TH.

Figure 3:
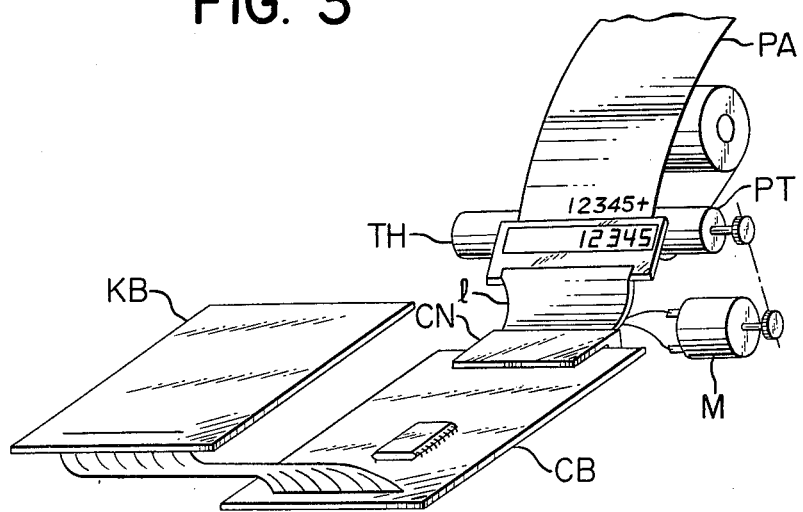
FIG. 3 is a perspective view of an electronic apparatus in which the present invention is embodied.

An example of apparatus provided with the printer head with display shown in FIG. 2 is illustrated in FIG. 3.

Since, as seen in FIG. 3, the display panel DP and the thermal head TH are united together according to the invention, the apparatus dispenses with the display print board DB for mounting display panel DP, signal line wiring $l_1$ and connector $CN_1$ for connection between the display panel DP and the operation part CB which were all indispensable for a conventional apparatus as shown in FIG. 1. Because of the above parts being eliminated, spaces for receiving them also become unnecessary.

The present invention is applicable also to another type of apparatus such as a thermal ink jet printer. In this type of printer, ink is jetted from ink jet nozzles while heating the ink by making use of electrothermal transducer elements to effect printing on a recording paper. An example of such thermal ink jet printer is disclosed in Japanese Patent Application No. 118,798/1977. A liquid crystal display device also can be arranged on the printing head of such type of printer. This embodiment of the present invention will be described hereinafter with reference to FIGS. 4 and 5.

Figure 4:
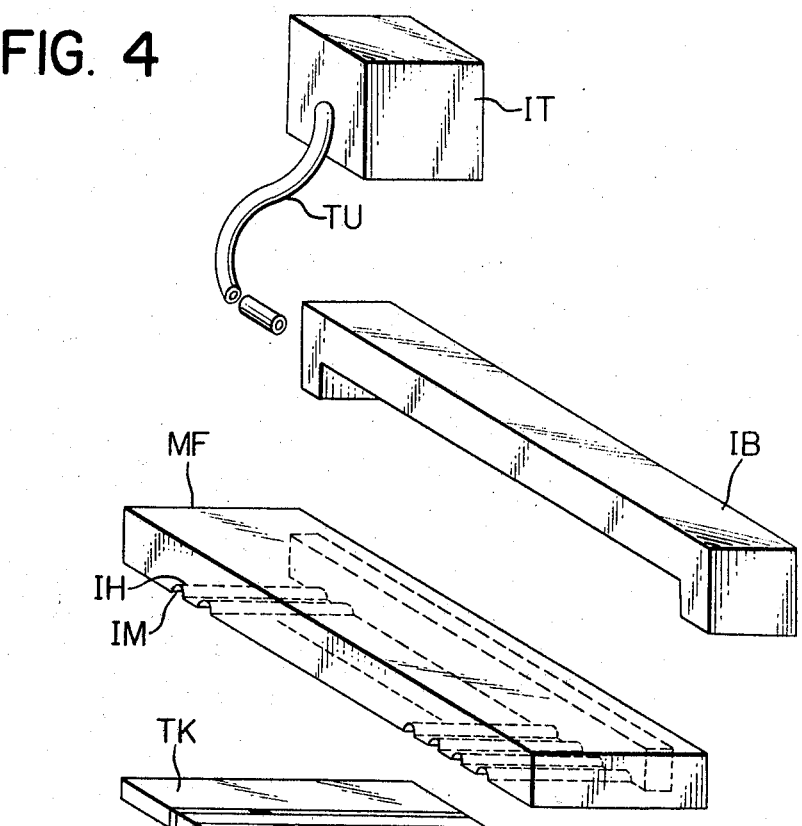
FIGS. 4 and 5 show another embodiment of the present invention.

In FIG. 4, TK designates a thermal base plate on which the above-mentioned number (5× the number of figures) of thermal elements are disposed in a row in the manner shown in the drawing. The thermal base plate is covered by a slotted cover plate MF. The thermal elements can be arranged on the surface of the thermal base plate at the side opposed to the slotted cover plate MP so that heat may be transmitted to the opposite side (heat sensitive paper side) surface. Also, the thermal elements may be arranged on the surface at the side of the heat sensitive paper. In this case, heat is transmitted from the heat sensitive paper side to the opposite side. It is also possible to form the thermal elements on both sides of the thermal base plate. When the thermal base plate is covered with the slotted cover plate, the slots provided on the cover plate MF form ink passage channels IH and ink orifices IM.

Designated by IB is a block common to all the ink channels which serves as an ink reservoir for supplying the ink to the ink channels IH.

IT is an ink tank filled with ink from which ink is fed to the common block IB through an ink tube TU.

Figure 5:
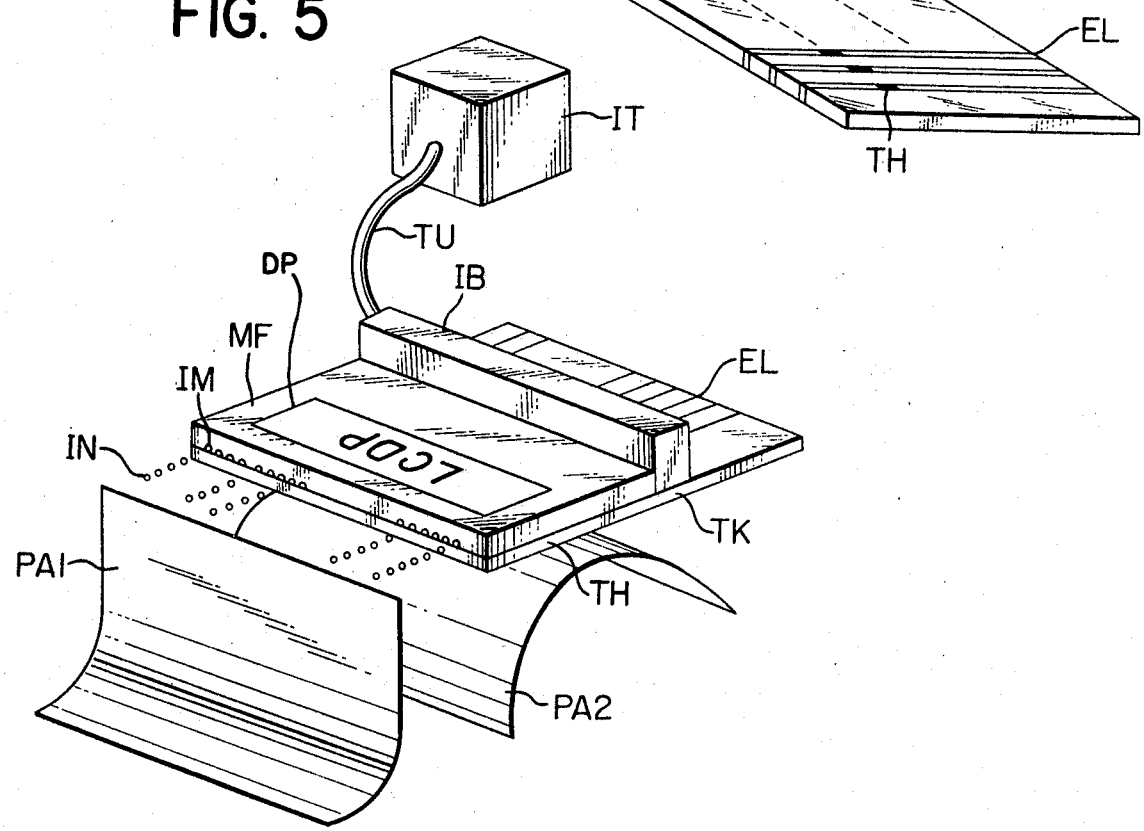

FIG. 5 shows the above parts in the position assembled. IT, IB, MF, TK and EL designate the same parts as in FIG. 4. The slotted cover plate MF is laid on the thermal base plate TK with the ink passage channels TK being aligned with the thermal elements TH respectively.

PA1 designates plain paper on which printing is carried out with ink jetted from the orifices IM. PA2 is a heat sensitive paper which is heated by thermal elements of the thermal base plate TK to effect thermal printing. Flying ink droplets are indicated by IN.

The manner of operation of above thermal ink jet printer is as follows:

At first, an amount of ink is fed to the common block IB from the ink tank IT through the ink tube TU. The ink temporarily pooled in the common block IB is then flowed into the ink passage channels IH formed between the slotted cover plate MF and the thermal base plate TK. In this position, electric power is supplied to the thermal elements from the electrodes EL so that the thermal elements generate heat. By this heat the ink within the ink channels IH is heated and air bubbles are generated in the ink. Owing to expansive power of these bubbles, the ink is jetted from the orifices IM and printing is effected on the common paper PA1. At the same time, by the heat generated from the thermal elements, the heat sensitive paper P2 in contact with the underside surface of the thermal base plate TK is also heated to effect thermal printing on the paper. On the cover plate MF, a liquid crystal display device DP is mounted.

In this manner, according to the invention, there is obtained such apparatus which has a dual function as a thermal printer and also as an ink jet printer and which is provided with an integral display part.

While the present invention has been particularly shown and described with reference to preferred embodiments thereof, it will be understood by those skilled in the art that the foregoing and other changes in form and details can be made therein without departing from the spirit and scope of the invention.

What I claim is:

1. An electronic device comprising:
    a base plate;
    a display part disposed on a surface of said base plate;
    a first group of signal lead wirings provided on the surface of said base plate and connected to said display part;
    a row of a group of dot shape thermal elements provided on an opposite surface of said base plate;
    a second group of signal lead wirings provided on the opposite surface of said base plate and connected to said thermal elements; and
    flexible wiring boards connected to each of said first and second groups of lead wirings.

2. An electronic device according to claim 1, wherein said display part comprises a liquid crystal display device.

3. An electronic device comprising:
    a base plate;
    a group of dot shaped thermal elements provided on said base plate for developing color on heat sensitive paper which reacts to thermal energy from said thermal elements; and
    an ink jet recorder disposed on a surface of said base plate and supplied with thermal energy from said thermal elements to jet droplets for recording on plain paper.

4. An electronic device according to claim 3, wherein bubbles are generated from recording liquid supplied with thermal energy, and droplets are jetted onto the plain paper.

* * * * *